US008655943B2

(12) United States Patent
Gill et al.

(10) Patent No.: US 8,655,943 B2
(45) Date of Patent: Feb. 18, 2014

(54) WEB SERVER PROVIDING ACCESS TO DOCUMENTS HAVING MULTIPLE VERSIONS

(75) Inventors: Bikram Singh Gill, Mohali (IN); Prabakar Paulsami, Tirunelveli Dist (IN)

(73) Assignee: Oracle International Corporation, Redwood Shores, CA (US)

( * ) Notice: Subject to any disclaimer, the term of this patent is extended or adjusted under 35 U.S.C. 154(b) by 912 days.

(21) Appl. No.: 12/790,865

(22) Filed: May 31, 2010

(65) Prior Publication Data

US 2011/0295936 A1 Dec. 1, 2011

(51) Int. Cl.
*G06F 15/16* (2006.01)

(52) U.S. Cl.
USPC .......... 709/203; 709/217; 709/219; 709/229; 709/231; 709/232

(58) Field of Classification Search
None
See application file for complete search history.

(56) References Cited

U.S. PATENT DOCUMENTS

| | | | | |
|---|---|---|---|---|
| 5,778,398 | A | 7/1998 | Nagashima | |
| 6,405,223 | B1 | 6/2002 | Kelley | |
| 6,510,439 | B1 * | 1/2003 | Rangarajan et al. | 715/229 |
| 6,954,901 | B1 | 10/2005 | Desai | |
| 2005/0262089 | A1 | 11/2005 | Wu | |
| 2005/0289446 | A1 | 12/2005 | Moncsko | |
| 2008/0040658 | A1 | 2/2008 | Reddy | |
| 2008/0072162 | A1 | 3/2008 | Dauerer | |
| 2008/0109427 | A1 * | 5/2008 | Miller et al. | 707/5 |
| 2008/0307071 | A1 * | 12/2008 | Vedula | 709/219 |
| 2011/0252082 | A1 * | 10/2011 | Cobb et al. | 709/203 |

OTHER PUBLICATIONS

"Claude Ostyn", "Globally Unique Identifiers", Ostyn Consulting, http://www.ostyn.com/standards/docs/guids.htm, Downloaded Circa: Jan. 1, 2001, pp. 1-2.
"Corporation for National Research Initiatives", "Handle System", http://www.handle.net/faq.html, Updated Date: Mar. 1, 2010, pp. 1-14.
"Karen Blakeman", "Monitoring Changes to Web Page Content", Rhodes-Blakeman Associates, http://www.rba.co.uk/sources/monitor.htm, Updated Date: Sep. 18, 2009, pp. 1-5.
"Anne R. Kenney et. al.", "Preservation Risk Management for Web Resources", D-Lib Magazine, http://www.dlib.org/dlib/january02/kenney/01kenney.html, vol. 8, No. 1, Publication Date: Jan. 2002, pp. 1-14.
"Gilby Productions", "TinyURL", http://tinyurl.com/, Downloaded Circa: Jan. 27, 2010, pp. 1-2.

(Continued)

*Primary Examiner* — Djenane Bayard
(74) *Attorney, Agent, or Firm* — Narendra Reddy Thappeta

(57) ABSTRACT

A web server provided according to an aspect of the present invention provides access to different versions of a document. In an embodiment, the web server sends the last version in response to a first request, and a specific requested version in response to a second request (identifying the specific requested version). According to another aspect, the specific requested version is sent when the request includes a corresponding version identifier along with a document identifier, and the last version is sent when the request includes only the document identifier. According to one more aspect, the web server sends a web page indicating all the versions of a document in response to a request for all the versions.

20 Claims, 5 Drawing Sheets

(56) References Cited

OTHER PUBLICATIONS

"Ping-Jer Yeh et. al.", "Tracking the Changes of Dynamic Web Pages in the Existence of URL Rewriting", Proceedings of Fifth Australasian Data Mining Conference, Publication Date: 2006, pp. 1-8.

"Ling Liu et. al.", "WebCQ—Detecting and Delivering Information Changes on the Web", Proceedings of Conference on Information and Knowledge Management, Publication Date: 2000, pp. 1-8.

"Steven Bell", "Web Page Change Detection Resources", http://stevenbell.info/keepup/wpcd.htm, Updated Date: Aug. 31, 2007, pp. 1-4.

"Activeurls", "Working the Web the Easy Way", http://activeurls.com/, Downloaded Circa: Jan. 1, 2001, pp. 1-3.

Jim Davis, David Fielding, Carl Lagoze, Richard Marisa, Dienst Protocol Specification, http://www.cs.cornell.edu/cdlrg/dienst/protocols/dienstprotocol.htm, date May 30, 2000, pp. 1-36.

* cited by examiner

350

| | Document ID (341) | Version (342) | File (343) | Available (344) |
|---|---|---|---|---|
| 371 | ProductDoc | 4.0 | /Docs/D4/7213.html | Yes |
| 372 | HelpDoc1 | 2.0 | /Docs/D1/1202.html | Yes |
| 373 | HelpDoc2 | 2.2 | /Docs/D1/1204.aspx | Yes |
| 374 | HelpDoc3 | 2.1 | /Docs/D1/1207.aspx | Yes |
| 375 | FusionDocProduct4 | 1.0 | /Docs/D1/2114.html | Yes |
| 376 | FusionDocProduct5 | 1.0 | /Docs/D1/2115.html | Yes |
| 377 | FusionDocProduct8 | 1.0 | /Docs/D1/2118.html | Yes |
| 378 | BrowseByProduct | 2.0 | /Docs/D3/4733.jsp | Yes |
| 379 | BrowseByCategory | 2.0 | /Docs/D3/4734.jsp | Yes |
| 380 | BrowseAll | 2.0 | /Docs/D3/4799.jsp | Yes |

400

```
Docs
 - D1
    - 1202.html
    - 1204.aspx
    - 1207.aspx
    - 1207-old.aspx
 - D2
    - 2112.html
    - 2114.html
    - 2115.html
    - 2116.html  <- 420
    - 2118.html
 - D3
    - 4733.jsp
    - 4734.jsp
    - 4734-old1.jsp
    - 4734-old2.jsp
```

420

```
<html>
<head>
   <title> Fusion 1.0 Documentation -
         Product 6.0 documentation</title>
   <publish_id version="6.0">  <- 422
      ProductDoc  <- 425
   </publish_id>
</head>
<body>
      ......
</body>
</html>
```

| | 441 Document ID | 442 Version | 443 File | 444 Available |
|---|---|---|---|---|
| 471 | ProductDoc | 4.0 | /Docs/D4/7213.html | No |
| 472 | ProductDoc | 6.0 | /Docs/D2/2116.html | Yes |
| | HelpDoc1 | 2.0 | /Docs/D1/1202.html | Yes |
| | HelpDoc2 | 2.2 | /Docs/D1/1204.aspx | Yes |
| 473 | HelpDoc3 | 2.1 | /Docs/D1/1207-old.aspx | Yes |
| 474 | HelpDoc3 | 2.5 | /Docs/D1/1207.aspx | Yes |
| | FusionDocProduct4 | 1.0 | /Docs/D1/2114.html | Yes |
| 475 | FusionDocProduct5 | 1.0 | /Docs/D1/2115.html | No |
| | FusionDocProduct8 | 1.0 | /Docs/D1/2118.html | Yes |
| | BrowseByProduct | 2.0 | /Docs/D3/4733.jsp | Yes |
| 476 | BrowseByCategory | 2.0 | /Docs/D3/4734-old1.jsp | Yes |
| 477 | BrowseByCategory | 3.0 | /Docs/D3/4734-old2.jsp | Yes |
| 478 | BrowseByCategory | 4.0 | /Docs/D3/4734.jsp | Yes |
| 479 | BrowseAll | 2.0 | /Docs/D3/4799.jsp | No |

*FIG. 4B*

WEB SERVER PROVIDING ACCESS TO DOCUMENTS HAVING MULTIPLE VERSIONS

BACKGROUND OF INVENTION

1. Technical Field

The present disclosure relates to web server technologies, and more specifically to a web server providing access to documents having multiple versions.

2. Related Art

Web servers refer to systems that serve content to client systems sending corresponding requests. In a common configuration, a web server receives requests for content on Internet from multiple client systems according to high level protocols such as hypertext transfer protocol (HTTP), file transfer protocol (FTP), etc., and sends the requested content as a response according to the same protocol.

The content served by web servers is often hosted in the form of documents stored as respective files on a persistent storage (e.g., file server or a database). Each document on a web server is identified on the Internet by a corresponding unique universal resource locator (URL). Accordingly, a user may use a client application such as a web browser, FTP client, etc. on a client system, to send requests containing the URL of the document sought to be accessed. The web server (to which the requests are forwarded) may then provide access to the documents/files specified in the URL as a corresponding response(s) to the requests.

There are often multiple versions of a document. Typically, a version of the document is changed in some respects to form the next version of the document, for example, to provide more updated content. Users may wish to access different versions of such document.

BRIEF DESCRIPTION OF THE DRAWINGS

Example embodiments of the present invention will be described with reference to the accompanying drawings briefly described below.

FIG. 4A depicts the manner in which documents are stored in a web server at a second time instance (different from the first time instance) in one embodiment.

FIG. 4B depicts portions of a mapping data maintained and used (at a second time instance) by a web server to identify different versions of a document in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A web server provided according to an aspect of the present invention provides access to different versions of a document. In an embodiment, the web server sends the last version in response to a first request, and a specific requested version in response to a second request (identifying the specific requested version).

According to another aspect of the present invention, the web server sends the specific requested version when the request includes a corresponding version identifier along with a document identifier, and sends the last version when the request includes only the document identifier.

In one embodiment, the web server identifies the last and specific versions (in response to the first and second requests) based on a document identifier and a corresponding version identifier embedded in corresponding files, which also stores the content representing each version of the document.

According to yet another aspect, the web server sends a web page indicating all the versions of a document in response to a request for all the versions. In one embodiment, the web page includes a corresponding link for each version of the document, thereby enabling a user to select the corresponding link for a desired version of the document. The web server sends the desired version of the document in response to the user selecting the corresponding link in the web page.

According to one more aspect of the present invention, a web server sends another version of a document when a requested version is not available in the web server. In an embodiment, the last version of the document is sent as the another version.

According to an aspect of the present invention, the web server first generates a mapping data indicating the file corresponding to each combination of document identifier and version identifier based on inspecting the files stored on the web server. In response to determining that a file specified by a static URL contained in a request is not available, the web server examines the mapping data to identify that the requested file corresponds to a document identifier and then sends the last version of the document (identified by the document identifier) as the response to the request.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
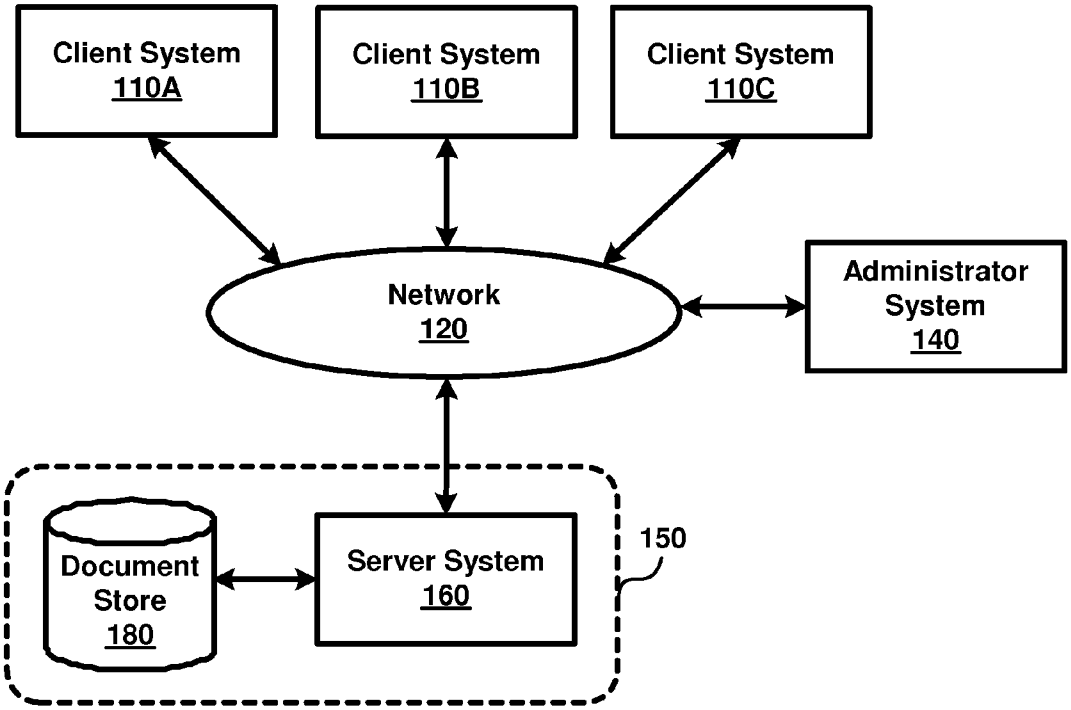
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, network 120, administrator system 140 and web server 150 (shown containing server system 160 and document store 180.

Merely for illustration, only representative number/type of systems is shown in FIG. 1. Many environments often contain many more data centers, systems, both in number and type, depending on the purpose for which the environment is designed. Each system/device of FIG. 1 is described below in further detail.

Network 120 provides connectivity between client systems 110A-110C, administrator system 140 and web server 150.

Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 120.

Each of client systems 110A-110C represents a system such as a personal computer, workstation, mobile station, etc., used by users to generate user/client requests to web server 150 (in particular, to server applications executing in server system 160). The requests may be generated using appropriate user interfaces. In general, a client system sends requests directed to web server 150 for accessing desired documents. Each request is sent in the form of an IP packet having an IP address corresponding to the web server in the destination address field, and also includes the URL of the desired documents in the packet content (using, for example, socket programming techniques well known in the relevant arts). The client system then receives (access to) the documents as corresponding response from web server 150.

Document store 180 represents a non-volatile (persistent) storage facilitating storage and retrieval of documents. As noted above, multiple versions of a document may be stored in document store 180. In one embodiment, document store 180 is implemented as a file server providing storage and retrieval of documents in the form of files organized as one or more directories, as is well known in the relevant arts. Alternatively, document store 180 may be implemented using relational database technologies and therefore provide storage and retrieval of documents (or data portions containing the content of the documents) using structured queries according to SQL (Structured Query Language). Though, document store 180 is shown external to server system 160, it may be appreciated that in alternative embodiment, document store 180 may be provided as an internal storage (e.g., hard disk) within server system 160, or as a combination of internal/external storages.

Administrator system 140 represents a system such as a personal computer, workstation, mobile station, etc., used by administrators to perform maintenance of web server 150. For example, administrators may perform various maintenance tasks such as adding new documents to document store 180, changing or removing documents already stored in document store 180, moving documents from one location to another location in document store 180, etc. Administrators may also specify which of the documents in document store 180 can be accessed by users using client systems 110A-110C.

Server system 160 represents a system executing server applications capable of processing user/client requested received from users using one of client systems 110A-110C. A server application receives requests for accessing specific documents from one of client systems 110A-110C, retrieves the specific documents (based on the URLs specified in the request) from document store 180, and then sends (provides access to) the retrieved documents to the requesting client system. The server application may also facilitate administrators using administrator system 140 to perform various maintenance tasks on the documents maintained in document store 180 as well as internal storage. Examples of server applications are Apache HTTP Server available from Apache Software Foundation and Internet Information Service (IIS) software available from Microsoft Corporation. Server system 160 and document store 180 together form web server 150 providing access to documents to multiple users.

Web server 150, provided according to several aspects of the present invention, provides access to multiple versions of a document, as described below with examples.

3. Providing Access to Multiple Versions of Documents

Figure 2:
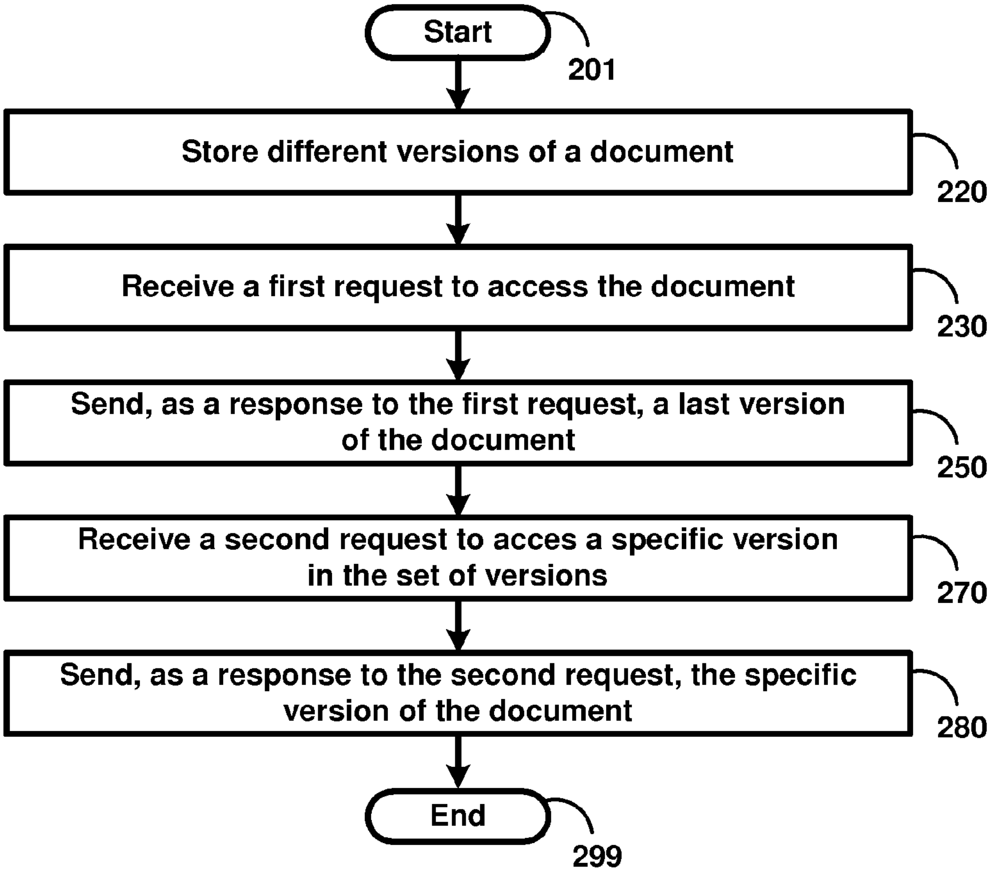
FIG. 2 is a flow chart illustrating the manner in which a web server provides access to multiple versions of documents according to an aspect of the present invention.

FIG. 2 is a flow chart illustrating the manner in which a web server provides access to multiple versions of documents according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, web server 150 stores different (multiple) versions of a document. The different versions may correspond to different changes made to the content of the document, the name/attributes of the document, the location of the document, etc. at different time instances. The changes may be performed (as part of maintenance tasks) by administrators using administrator system 140.

In step 230, web server 150 receives a first request to access the document. The first request may be received from users using one of client systems 110A-110C and is directed to web server 150.

In step 250, web server 150 sends (to the requesting client system) a last version of the document as a response to the first request. The last version of the document may be specified by an administrator, for example, as an increasing numeric value for a version identifier with the last version corresponding to the version with the largest numeric value. Alternatively, the last version may be determined based on the attributes of the documents, such as the changed date and time associated with each version of the document, with the latest version corresponding to the most recently changed version of the document.

In one embodiment, a text (representing a "flag") embedded in the version of a document is used to identify the default/last version of a document. An administrator manually includes the text in the desired version to indicate the last version of the document, before storing the version on web server 150. Alternatively, web server 150 is designed to embed the flag in the latest version of the document when the latest version is uploaded to web server 150 by an administrator.

In step 270, web server 150 receives a second request to access a specific version (in the set of versions) of the document. The second request specifies a version identifier identifying the specific version sought to be accessed and is directed to web server 150. The second request may be received from the same user sending the first request or from a different user on corresponding one of client systems 110A-110C.

In step 280, web server 150 sends (to the requesting client system) the specific version of the document in response to the second request. The specific version to be sent may be identified based on the version identifier specified in the second request. The flow chart ends in step 299.

Thus, web server 150 provides access to different versions of a document stored on the web server. The description is continued illustrating the manner in which the steps of FIG. 2 are implemented in one embodiment.

4. Example Implementation

FIGS. 3A-3B and 4A-4B together illustrate the manner in which a web server (150) provides access to different versions of a document in one embodiment. Each of the Figures is described in detail below.

The description is continued assuming that web server 150 is uniquely identified by the domain name "www.acme.com" (and a corresponding IP address on network 120), hosts documents in the form of files (in document store 180 implemented as a file server) and serves/provides access to the files using HTTP protocol.

Figures 3A, 3B:
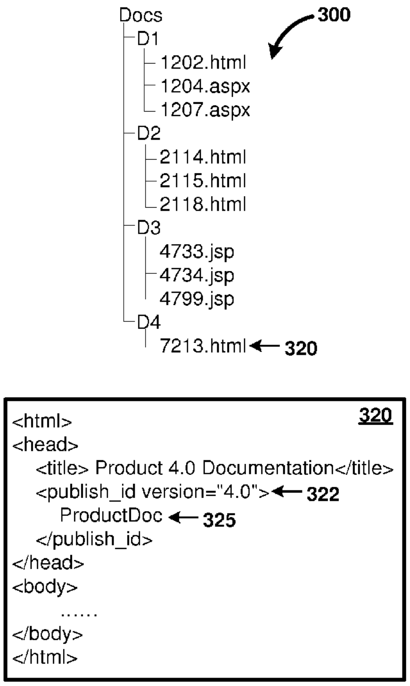
FIG. 3A depicts the manner in which documents are stored in a web server at a first time instance in one embodiment.
FIG. 3B depicts portions of a mapping data maintained and used (at a first time instance) by a web server to identify different versions of a document in one embodiment.

FIG. 3A depicts the manner in which documents are stored in a web server at a first time instance in one embodiment. Hierarchy 300 depicts the manner in which documents in the form of files (names ending with ".html", ".aspx", ".jsp") are stored in web server 150 (in particular, in the file server of document store 180). The files are shown organized in directories "D1", "D2", "D3" and "D4", which in turn are shown to be contained in the top level directory "Docs".

Accordingly, file 320 may be identified as "/Docs/D4/7213.html", where "/Docs/D4" indicates the path in hierarchy 300 and "7213.html" represents the name of the file/document. File 320 may be accessed by a user using one of client systems 110A-110C by sending a request containing the text "http://www.acme.com/Docs/D4/ 7213.html" as the URL. The other files of hierarchy 300 may be similarly accessed by appending the path and the name of the file to the protocol and domain name.

Such a URL specifying the exact location of the file/document in the web server is referred to as a static URL (in contrast to the dynamic URL described below). A static URL is generally of the form "http://www.acme.com/path/to/file.html", where the text "http" indicates the protocol, the text "www.acme.com" indicates the domain name identifying the web server (150), the text "/path/to" indicates the physical/virtual location of the document in the web server and the text "file.html" indicates the name of the file/document.

According to an aspect of the present invention, each document is associated with a unique document identifier, which is embedded (along with the version identifier) in the content of the different versions of the document. The requests (received in step 230 and 270) may be required to specify the document (and version) identifier for the document sought to be accessed.

In one embodiment, the document and version identifiers are specified respectively as the content and value of the attribute "version" of a "<publish_id>" tag specified in the file/document. Thus, the content of file 320 indicates that the file/document "7213.html" is associated with the document identifier "ProductDoc" (line 325) and the version identifier "4.0" (line 322). The other files/documents in hierarchy 300 may be similarly associated with corresponding same/different document and version identifiers.

Web server 150 may be designed to inspect the content of the files in hierarchy 300 to identify the latest version (in response to the first request) and the specific version (in response to the second request). In one embodiment, to simplify the identification of the latest/specific version of a document, web server 150 maintains a mapping data which specifies the files (in hierarchy 300) for each combination of document and version identifier as described below with examples.

5. Mapping Data

FIG. 3B depicts portions of a mapping data maintained and used (at a first time instance) by a web server to identify different versions of a document in one embodiment. The mapping data is shown in a tabular format merely for convenience. However, in alternative embodiments, the mapping data may be according to other formats such as extensible markup language (XML) as will be apparent to one skilled in the relevant arts by reading the disclosure herein.

Table 350 represents the mapping data maintained by web server 150 corresponding to the files shown in hierarchy 300. Columns 341 "Document ID" and 342 "Version" respectively specify the document and version identifier embedded in the file specified in column 343 "File", while column 344 "Available" specifies whether the file is available for public access by users using client system 110A-110C. A 'no' value in Available column 344 implies one of several situations such as (A) a newer version of the document is available, (B) that the file corresponding to the document has been removed from document store 180, or (C) the administrator has configured that the file is no longer to be served.

Accordingly, each of rows 371-380 specifies the files in hierarchy 300 for each combination of document and version identifier. In particular, row 371 specifies the combination of the document identifier "ProductDoc" (column 341) and version identifier "4.0" (column 342) is mapped to the file "Docs/D4/7213.html" (column 343), that is file 320 in hierarchy 300, which is available (column 344). Row 371 may be generated by web server 150 based on the inspection of the content (in particular, lines 322 and 325) of file 320 shown in FIG. 3A. Similarly, rows 372-380 specify the files corresponding to other combinations of the document and version identifiers and may be generated by web server 150 by inspection of the other files shown in hierarchy 300. Thus, in one embodiment, web server 150 is designed to periodically crawl/inspect all the files stored in documents store 180 and to update the mapping data of table 350.

Mapping data of table 350 may be used by web server 150 for processing dynamic URLs, which specify criteria for accessing a document, in contrast to the specific location of the document specified in static URLs. For example, in response to a dynamic URL of the form "http://www.acme.com/directory:GetPageById=ProductDoc", where "directory:" indicates that the URL is dynamic and needs to be processed and "GetPageById" indicates that the page/file/document identified by the text "ProductDoc" is sought to be accessed, web server 150 may be designed to send the latest version of the document whose document identifier (in column 341) matches the specified text. As such, web server 150 may send file 320 ("/Docs/D4/7213.html") as the response to the above noted dynamic URL, since file 320 is the latest (and only) version of the document identified by the text "ProductDoc".

In response to a dynamic URL of the form "http://www.acme.com/directory:GetPageVersionById=ProductDoc&Version=4.0", where "GetPageVersionById" indicates that only a specific version of the document identified by the text "ProductDoc" is sought to be accessed and "Version" indicates the version identifier "4.0" of the specific version, web server 150 may be designed to identify and send the file that is mapped to the combination of the document and version identifier as the requested specific version of the document. Thus, in response to the above URL, web server 150 sends file 320 "/Docs/D4/7213.html"

specified for the combination of the document identifier "ProductDoc" and the version identifier "4.0" (in row 371).

In general, on receiving a request specifying a dynamic URL for a document, web server 150 checks whether the received URL contains just the document identifier (e.g. the first request of step 230) or the version identifier in addition (e.g. the second request of step 270). Web server 150 then determines to send the specific version of the document corresponding to the version identifier if the received URL contains the version identifier in addition to the document identifier and to send the last version otherwise.

It may be observed that the mapping data shown in table 350 indicates that the document identifiers are unique for each of the files and that only one version of each document exists at the first time instance. Accordingly, web server 150 may send the same version (file 320) of the document as the latest/specific versions as a response to the different requests (in steps 230 and 270) received from users.

It may be appreciated that the files shown in hierarchy 300 may be changed (as part of maintenance tasks) by administrators using administrator system 140. The changes may involve addition of new files, editing of the content/name/attributes of existing files, removal of files, moving of files from one location to another, changing the public availability of files, etc to hierarchy 300. A sample set of changed documents (in particular, files of hierarchy 300) is described below with examples.

6. Changed Documents

FIG. 4A depicts the manner in which documents are stored in a web server at a second time instance (different from the first time instance) in one embodiment. Hierarchy 400 depicts the set of files shown in hierarchy 300 after the files have been changed by administrators using administrator system 140. It may be observed, that some of the files (such as "4799.jsp") as well as directories (such as "D4") have been removed, some new files (such as "2112.html") have been added, and some of existing files (such as "1207.aspx", "4374.jsp") have been modified multiple times (with the names of the previous versions prefixed with "-old", "-old1", etc.).

In particular, file 420 represents file 320 that has been renamed from "7213.html" to "2116.html", moved from directory D4 to D2 and whose content has been changed, for example, to bring the product documentation (the content of file 320) as part of the documentation of a larger application ("Fusion") maintained in directory D2. The content of file 420 is shown specifying the same document identifier "ProductDoc" (in line 425) as that specified in file 320 (in line 325), though the version identifier "6.0" specified (in line 422) is different from the version "4.0" specified in file 320 (in line 322).

Thus, files 320 and 420 are indicated to be two different versions of a document (identified by the unique identifier "ProductDoc"). The manner in which mapping data 350 is updated to capture the changes made to the files of hierarchy 300 is described below with examples.

FIG. 4B depicts portions of a mapping data maintained and used (at a second time instance) by a web server to identify different versions of a document in one embodiment. Table 450 represents the mapping data maintained by web server 150 corresponding to the files shown in hierarchy 400. Each of columns 441-444 is similar to respective columns 341-344, and accordingly their description is not repeated here for conciseness.

Each of rows 471-479 specifies the mappings between files and the combination of document and version identifier that have been updated or inserted due to the changes made to the files of hierarchy 300. The unchanged rows (compared to FIG. 3B) are not numbered. In particular, row 471 represents row 371 updated to indicate that the older version "4.0" of the document "ProductDoc" is not available (value "No") due to the renaming/movement of the mapped file "Docs/D4/7213.html", while row 472 represents a new row inserted corresponding to file 420 "/Docs/D2/2116.html" for the combination of the document identifier "ProductDoc" and version identifier "6.0" (as specified in the content of file 420 shown in FIG. 4A).

Each of row sets 473-474 and 476-478 represent rows (374 and 379 in table 350) that have been updated and new rows inserted corresponding to the various changes/versions of the documents respectively identified by the identifiers "HelpDoc3" and "BrowseByCategory". Each row set (e.g. 476-478) may be viewed as a set of versions maintained for the corresponding document, with each version identified by the corresponding version identifier specified in column 442. For illustration, the different versions for a document (e.g. "BrowseByCategory") are specified as increasing numeric values (e.g. 2.0, 3.0 and 4.0 in rows 476-478), with a larger numeric value (3.0) indicating a later version compared to a smaller numeric value (2.0) and the last version indicated by the largest numeric value (4.0).

It may be observed that the availability of the documents (column 444) specified in rows 475 and 479 is set to the value "No", for reasons noted above. The non-availability of the document "BrowseAll" in row 479 is due to the removal of the file ("/Docs/D3/4799.jsp") from hierarchy 400. However, document "FusionDocProduct5" in row 475 may be manually specified (by an administrator using administrator system 140) to be not available, though the corresponding file ("/Docs/D1/2115.html") is present in hierarchy 400.

7. Processing Requests for Accessing Documents

Web server 150 uses the mapping data shown in table 450 for processing requests for documents received after the second time instance. In particular, for the dynamic URL "http://www.acme.com/directory:GetPageById=ProductDoc", web server 150 first determines rows 471-472 as matching (based on column 441) the document identifier "ProductDoc" and then identifies the latest version of the document as being file 420 "/Docs/D2/2116.html" (in row 472) since the version identifier "6.0" is the largest. Web server 150 then sends file 420 as the response to the dynamic URL.

Web server 150 may handle the other dynamic URL, "http://www.acme.com/directory:GetPageVersionById=ProductDoc&Version=4.0" in any desired manner. For example, web server 150 may be designed to identify that the requested version (4.0) of the document is no longer available (value "No" in column 444 of row 471), and accordingly send the latest version (6.0) of the document as a response to the other dynamic URL.

Alternatively, web server 150 may be designed to send (as the response) a web page indicating that the requested version of the document is not available on web server 150, with the web page also containing links to other versions of the document that are currently available on web server 150, thereby enabling a user to select the desired version of the document (by clicking on the appropriate link).

The web page sent as the response may also include a timer (that counts down from a pre-determined number of seconds to zero) indicating to the user that the latest version of the document will be provided if the user does not manually select any of the links provided in the web page before the timer reaches zero. On the timer reaching zero, the web page sends a request (e.g. similar to the first dynamic URL) to web server 150, which then provides the latest version of the document ("ProductDoc") to the user.

It may be appreciated that static URLs (such as "http://www.acme.com/Docs/D4/7213.html") that specify the location of the documents on web server 150 may not be valid at the second time instance (corresponding to when mapping data of table 450 is effective). In other words, the files/documents that the static URLs point to may not be available due to performance of various maintenance tasks such as movement of the file, renaming of the file, removal of the file, etc.

According to an aspect of the present invention, web server 150 is designed to identify the document identifier of the document based on the matching of files specified in static URLs with the files specified in mapping data (column 443) and to then send the latest version of the document corresponding to the identified document identifier as a response to the static URL.

Thus, in response to the static URL "http://www.acme.com/Docs/D4/7213.html", web server 150 first checks for the file "/Docs/D4/7213.html" in column 443 of table 450 to identify the document identifier "ProductDoc" corresponding to a matching row (471), and then sends the latest version (file 420) of the document having the document identifier "ProductDoc" (specified in row 472) as the response to the static URL.

Accordingly, the 'page not found' error notifications may be avoided when a later version of a document is present in document store 180.

Web server 150, in addition to the above noted URLs, may also receive a dynamic URL in the form "http://www.acme.com/directory:GetPageVersionsById=BrowseByCategory", where the text "GetPageVersionsById" indicates that all the versions of the document identified by the text "BrowseByCategory" are sought to be accessed. The manner in which such a dynamic URL requesting all the versions of a document is processed is described below with examples.

8. Processing Requests for All Versions of a Document

According to an aspect of the present invention, web server 150 generates a document (in the form of a web page) containing links to the different versions of the requested document and sends the generated document as a response to the dynamic URL. The links may be designed to send requests (either containing static or dynamic URLs) to web server 150 for the specific versions in response to selection by the user. Furthermore, the web page may be generated to provide additional information such as the version number, the availability, the created/modified dates of each of the versions of the document, etc.

Thus, in response to the request for all the versions of the "BrowseByCategory" document, web server 150 may generate a web page with links to each of the files specified in rows 476-478 (determined as matching the requested document identifier). A first link may be designed to send a request containing the static URL "http://www.acme.com/Docs/D3/4734.jsp", while a second link may be designed to send (to web server 150) a request containing the static URL "http://www.acme.com/Docs/D3/4734-old2.jsp" on respective selection by the user.

Alternatively, the first and second links may be designed to send requests containing dynamic URLs of the form "http://www.acme.com/directory:GetPageVersionById=BrowseByCategory&Version=VID", where the text "VID" is replaced by the specific version identifier ("4.0" for the first link, and "3.0" for the second link) sought to be accessed. Thus, web server 150 facilitates a user to request for all the versions of a document and to then access the desired one of the versions (provided in the web page).

While the description of above is provided with respect to dynamic URLs for illustration, it should be appreciated that alternative embodiments may be designed to use static URLs having virtual directories that mimic dynamic URLs (at least in implementations based on Apache HTTP Server applications, as will be apparent to one skilled in the relevant arts).

It should be appreciated that the features described above can be implemented in various embodiments as a desired combination of one or more of hardware, executable modules, and firmware. The description is continued with respect to an embodiment in which various features are operative when executable modules are executed.

9. Digital Processing System

Figure 5:
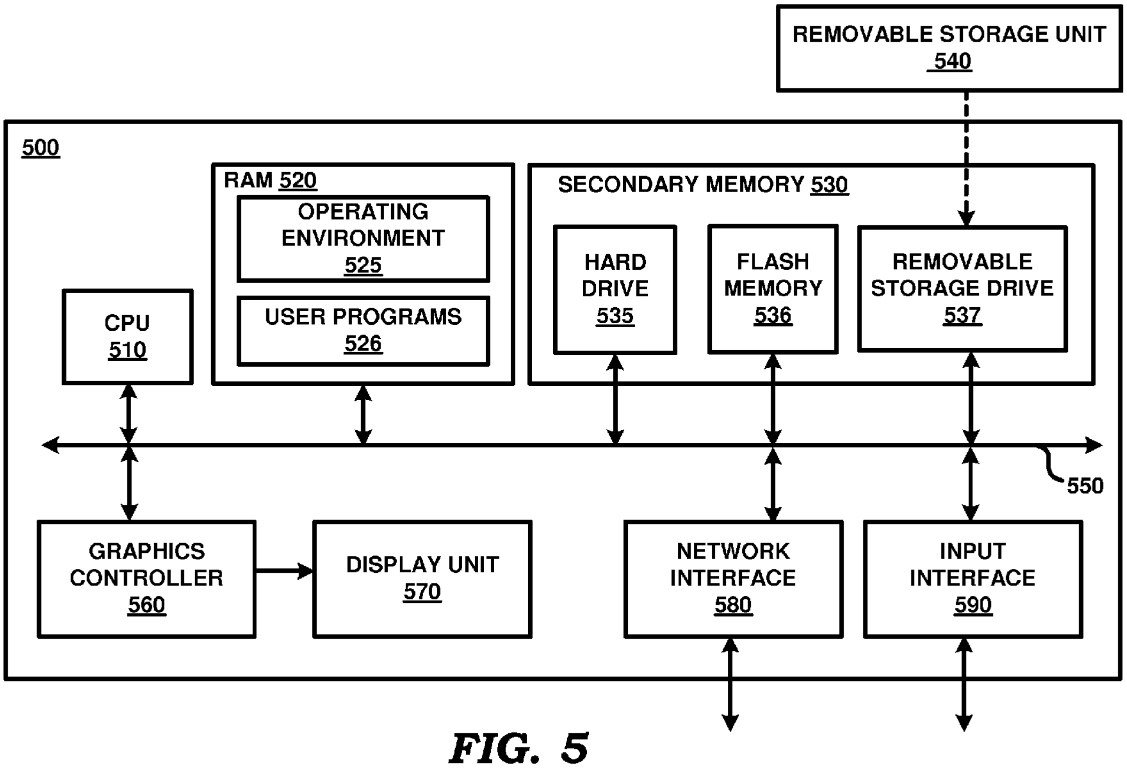
FIG. 5 is a block diagram illustrating the details of a digital processing system in which various aspects of the present invention are operative by execution of appropriate executable modules.

FIG. 5 is a block diagram illustrating the details of digital processing system 500 in which various aspects of the present invention are operative by execution of appropriate executable modules. Digital processing system 500 may correspond to server system 160.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting operating environment 525 and/or other user programs 526 (such as file management applications, load balancers, etc.). In addition to operating environment 525, RAM 520 may contain other software programs such as device drivers, virtual machines, etc., which provide a (common) run time environment for execution of other/user programs.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 provides connectivity to a network (e.g., using Internet Protocol), and may be used to communicate with other systems connected to the network.

Secondary memory 530 may contain hard drive 535, flash memory 536, and removable storage drive 537. Secondary memory 530 may store the data (for example, portions of the mapping data of FIGS. 3B and 4B, etc.) and software instructions (which when operative perform the steps of FIG. 2), which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of providing access to documents served by a web server, said method comprising:

storing, in said web server, a set of versions of a document;

receiving, by said web server, a first request to access said document, wherein said first request specifies a document identifier in the URL for said document;

sending, from said web server, a last version in said set of versions of said document as a response to said first request;

receiving, by said web server, a second request identifying a specific version in said set of versions, wherein said second request specifies a version identifier corresponding to said specific version in addition to said document identifier in the URL for said document;

sending from said web server, said specific version of said document as a response to said second request, checking whether each received URL contains just said document identifier or said version identifier in addition; and determining to send said specific version of said document corresponding to said version identifier if the received URL contains said version identifier and to send said last version otherwise.

2. The method of claim 1, further comprising:

embedding said document identifier and a corresponding version identifier in a corresponding file, which also stores the content representing each of said set of versions of said document; and identifying, based on said document identifier and said version identifier stored in the corresponding files, said last version in response to said first request and said specific version in response to said second request.

3. The method of claim 2, further comprising:

receiving, by said web server, a third request for all of said set of versions of said document; and sending, from said web server, a web page indicating said set of versions of said document as a response to said third request.

4. The method of claim 3, wherein said web page includes a corresponding link for each of said set of versions of said document, said method further comprising:

enabling a user to select the corresponding link of a desired version in said set of versions of said document; and sending, from said web server, said desired version of said document in response to said user selecting the corresponding link.

5. The method of claim 3, wherein each of said set of version is represented in the form of a corresponding URL in said document, said method further comprising including a timer in said web page, wherein said web page is enabled to send a request for the last version of said document if none of the URLs representing any of the versions is selected by the expiry of said timer, wherein said request for the last version is received by said web server in the form of a corresponding URL.

6. The method of claim 2, further comprising:

inspecting the content of each of said files to determine the document identifier and the version identifier specified in each file; and generating a mapping data which indicates the file corresponding to each combination of the document identifier and the version identifier, based on said inspecting, wherein said identifying examines said mapping data to identify a first file and a second file respectively corresponding to said last version and said specific version, wherein said sending sends the content of said first file as the response to said first request and the content of said second file as the response to said second request.

7. The method of claim 6, further comprising:

receiving, by said web server, a fourth request containing a static universal resource locator (URL), said static URL specifying a third file stored on said web server;

determining that said third file is not available in said web server;

examining said mapping data to identify that said third file corresponds to the combination of said document identifier for said document and a second version identifier corresponding to a second version in said set of versions of said document, said second version being not available in said web server; and sending, from said web server, said last version of said document as a response to said fourth request.

8. The method of claim 1, further comprising:

receiving, by said web server, a third request for a second version of said document;

determining that said second version is not available in said web server; and sending, from said web server, another version of said document as a response to said third request.

9. The method of claim 8, wherein said another version is said last version of said document.

10. A non-transitory machine readable storage medium storing one or more sequences of instructions for causing a web server to provide access to a set of versions of a document stored on said web server, wherein execution of said one or more sequences of instructions by one or more processors contained in said web server causes said web server to perform the actions of:

receiving a first request to access said document, said first request being in the form of an IP packet directed to said web server, wherein said first request specifies a document identifier in the URL for said document;

sending a last version in said set of versions of said document as a response to said first request;

receiving a second request identifying a specific version in said set of versions, said second request being in the form of another IP packet also directed to said web server, wherein said second request specifies a version identifier corresponding to said specific version in addition to said document identifier in the URL for said document;

sending from said web server, said specific version of said document as a response to said second request;

checking whether each received URL contains just said document identifier or said version identifier in addition; and determining to send said specific version of said document corresponding to said version identifier if the received URL contains said version identifier and to send said last version otherwise.

11. The non-transitory machine readable storage medium of claim 10, further comprising one or more instructions for:

embedding said document identifier and a corresponding version identifier in a corresponding file, which also stores the content representing each of said set of versions of said document; and identifying, based on said document identifier and said version identifier stored in the corresponding files, said last version in response to said first request and said specific version in response to said second request.

12. The non-transitory machine readable storage medium of claim 11, further comprising one or more instructions for:

receiving, by said web server, a third request for all of said set of versions of said document; and sending, from said web server, a web page indicating said set of versions of said document as a response to said third request.

13. The non-transitory machine readable storage medium of claim 12, wherein said web page includes a corresponding link for each of said set of versions of said document, further comprising one or more instructions for:

enabling a user to select the corresponding link of a desired version in said set of versions of said document; and sending, from said web server, said desired version of said document in response to said user selecting the corresponding link.

14. The non-transitory machine readable storage medium of claim 12, further comprising one or more instructions for:

inspecting the content of each of said files to determine the document identifier and the version identifier specified in each file; and generating a mapping data which indicates the file corresponding to each combination of the document identifier and the version identifier, based on said inspecting, wherein said identifying examines said mapping data to identify a first file and a second file respectively corresponding to said last version and said specific version, wherein said sending sends the content of said first file as the response to said first request and the content of said second file as the response to said second request.

15. The non-transitory machine readable storage medium of claim 14, further comprising one or more instructions for:

receiving, by said web server, a fourth request containing a static universal resource locator (URL), said static URL specifying a third file stored on said web server;

determining that said third file is not available in said web server;

examining said mapping data to identify that said third file corresponds to the combination of said document identifier for said document and a second version identifier corresponding to a second version in said set of versions of said document, said second version being not available in said web server; and sending, from said web server, said last version of said document as a response to said fourth request.

16. The non-transitory machine readable medium of claim 12, wherein each of said set of version is represented in the form of a corresponding URL in said document, further comprising including a timer in said web page, wherein said web page is enabled to send a request for the last version of said document if none of the URLs representing any of the versions is selected by the expiry of said timer, wherein said request for the last version is received by said web server in the form of a corresponding URL.

17. A web server serving documents, said web server operable to:

store a set of versions of a document;

receive a first request to access said document, wherein said first request specifies a document identifier in the URL for said document;

send a last version in said set of versions of said document as a response to said first request;

receive a second request identifying a specific version in said set of versions, wherein said second request specifies a version identifier corresponding to said specific version in addition to said document identifier in the URL for said document;

send said specific version of said document as a response to said second request;

check whether each received URL contains just said document identifier or said version identifier in addition; and determine to send said specific version of said document corresponding to said version identifier if the received URL contains said version identifier and to send said last version otherwise.

18. The web server of claim 17, wherein said document identifier and a corresponding version identifier is embedded in a corresponding file, which also stores the content representing each of said set of versions of said document, said web server further operable to:

inspect the content of each of said files to determine the document identifier and the version identifier specified in each file;

generate a mapping data which indicates the file corresponding to each combination of the document identifier and the version identifier, based on said inspecting; and identify, based on said document identifier and said version identifier specified in the request and said mapping data, a first file corresponding to said last version for said first request and a second file corresponding to said specific version for said second request, wherein said web server sends the content of said first file as the response to said first request and the content of said second file as the response to said second request.

19. The web server of claim 18, further operable to:

receive a third request for all of said set of versions of said document; and send, as a response to said third request, a web page indicating said set of versions of said document, wherein said web page includes a corresponding link for each of said set of versions of said document, thereby enabling a user to select the corresponding link of a desired version in said set of versions of said document.

20. The web server of claim 19, wherein each of said set of version is represented in the form of a corresponding URL in said document, said web server being further operable to include a timer in said web page, wherein said web page is enabled to send a request for the last version of said document if none of the URLs representing any of the versions is selected by the expiry of said timer, wherein said request for the last version is received by said web server in the form of a corresponding URL.

* * * * *

UNITED STATES PATENT AND TRADEMARK OFFICE

CERTIFICATE OF CORRECTION

PATENT NO. : 8,655,943 B2
APPLICATION NO. : 12/790865
DATED : February 18, 2014
INVENTOR(S) : Gill et al.

It is certified that error appears in the above-identified patent and that said Letters Patent is hereby corrected as shown below:

In the Drawings

On sheet 2 of 5, in figure 2, under Reference Numeral 270, line 1, delete "acces" and insert -- access --, therefor.

Signed and Sealed this
Thirtieth Day of June, 2015

Michelle K. Lee
*Director of the United States Patent and Trademark Office*